United States Patent
Bao et al.

(10) Patent No.: US 10,412,005 B2
(45) Date of Patent: Sep. 10, 2019

(54) EXPLOITING UNDERLAY NETWORK LINK REDUNDANCY FOR OVERLAY NETWORKS

(71) Applicant: International Business Machines Corporation, Armonk, NY (US)

(72) Inventors: Lei Bao, Wuxi (CN); Guo X. He, Suzhou (CN); Liang Rong, Suzhou (CN); Gang Tang, Nanjing (CN)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 15/280,803

(22) Filed: Sep. 29, 2016

(65) Prior Publication Data

US 2018/0091426 A1    Mar. 29, 2018

(51) Int. Cl.
*H04L 12/743* (2013.01)
*H04L 12/26* (2006.01)
*H04L 29/06* (2006.01)

(52) U.S. Cl.
CPC ...... *H04L 45/7453* (2013.01); *H04L 43/0888* (2013.01); *H04L 43/16* (2013.01); *H04L 69/22* (2013.01)

(58) Field of Classification Search
None
See application file for complete search history.

(56) References Cited

U.S. PATENT DOCUMENTS

| 6,671,256 B1* | 12/2003 | Xiong | H04J 14/0227 370/230 |
| 9,356,866 B1* | 5/2016 | Sivaramakrishnan | H04L 45/7453 |
| 9,655,104 B1* | 5/2017 | Vivanco | H04W 76/28 |
| 2003/0112754 A1* | 6/2003 | Ramani | H04L 1/1635 370/230 |

(Continued)

FOREIGN PATENT DOCUMENTS

| WO | 2014/075527 A1 | 5/2014 |
| WO | 2015/068118 A1 | 5/2015 |

OTHER PUBLICATIONS

Kompella. IETF.ISSN:The Use of Entropy Labels in MPLS Forwarding 2070-1721, 2012.*

(Continued)

*Primary Examiner* — Jeffrey M Rutkowski
*Assistant Examiner* — Andre Tacdiran
(74) *Attorney, Agent, or Firm* — Patterson + Sheridan, LLP

(57) ABSTRACT

Embodiments disclose systems, methods, and computer program products to perform an operation for generating entropy values for packets in an overlay network. The operation generally includes generating a first entropy value for each packet in a first group of packets received in a sequence of packets from a host, and detecting an idle amount of time between the the first group of packets in the sequence of packets and a second group of packets in the sequence of packets received from the host. The operation (Continued)

also includes upon determining that the idle amount of time is greater than a first threshold, generating a second entropy value for each packet in the second group of packets. The operation further includes inserting the second entropy value in an outer header of each packet in the second group of packets, and transmitting the second group of packets to the underlay network.

20 Claims, 8 Drawing Sheets

(56) References Cited

U.S. PATENT DOCUMENTS

| | | | | |
|---|---|---|---|---|
| 2003/0152107 | A1* | 8/2003 | Pekonen | H04H 20/28 370/473 |
| 2006/0146729 | A1* | 7/2006 | Krautkremer | H04L 43/0852 370/252 |
| 2007/0058532 | A1* | 3/2007 | Wadekar | H04L 43/16 370/229 |
| 2007/0211645 | A1* | 9/2007 | Tachibana | H04L 43/00 370/252 |
| 2008/0002854 | A1* | 1/2008 | Tehranchi | G06F 21/10 382/100 |
| 2008/0295175 | A1* | 11/2008 | Ansari | H04L 63/1416 726/23 |
| 2011/0149973 | A1* | 6/2011 | Esteve Rothenberg | H04L 45/00 370/392 |
| 2012/0195201 | A1* | 8/2012 | Ishikawa | H04L 41/0896 370/235.1 |
| 2014/0369195 | A1* | 12/2014 | Marchenko | H04L 47/25 370/235 |
| 2015/0163144 | A1* | 6/2015 | Koponen | H04L 47/125 370/237 |
| 2015/0172198 | A1* | 6/2015 | Levy | H04L 47/24 370/232 |
| 2015/0201349 | A1* | 7/2015 | Lee | H04W 28/0236 370/236 |
| 2016/0080505 | A1 | 3/2016 | Sahin et al. | |
| 2016/0156537 | A1* | 6/2016 | Aumann | H04L 43/04 709/224 |
| 2016/0226758 | A1* | 8/2016 | Ashwood-Smith | H04L 45/72 |
| 2016/0285771 | A1* | 9/2016 | Kulkarni | H04L 47/215 |
| 2016/0330111 | A1* | 11/2016 | Manghirmalani | H04L 43/028 |
| 2016/0359881 | A1* | 12/2016 | Yadav | H04L 63/1425 |
| 2017/0063783 | A1* | 3/2017 | Yong | H04L 67/2814 |
| 2017/0085485 | A1* | 3/2017 | Vanini | H04L 47/125 |
| 2017/0149640 | A1* | 5/2017 | Narayanan | H04L 43/062 |
| 2017/0187569 | A1* | 6/2017 | Shiraki | H04L 41/0668 |
| 2017/0295100 | A1* | 10/2017 | Hira | H04L 43/0864 |
| 2018/0069795 | A1* | 3/2018 | Shen | H04L 47/122 |
| 2018/0077064 | A1* | 3/2018 | Wang | H04L 47/125 |

OTHER PUBLICATIONS

Implementing VXLAN, Cisco ASR 9000 Series Aggregation Services Router L2VPN and Ethernet Services Configuration Guide, Release 5.3.x, <http://www.cisco.com/c/en/us/td/docs/routers/asr9000/software/asr9k_r5-3/lxvpn/configuration/guide/b-l2vpn-cg53xasr9k/b-l2vpn-cg53xasr9k_chapter_01010.pdf>.

* cited by examiner

EXPLOITING UNDERLAY NETWORK LINK REDUNDANCY FOR OVERLAY NETWORKS

BACKGROUND

The present disclosure generally relates to virtual networking, and more specifically, to techniques for fully exploiting the link redundancy of an underlay network for overlay networks.

Overlay networks are an example of a virtual networking technology that can be used to provide virtual networking services to tenants (e.g., enterprises, such as an individual, organization, company, etc.) in a multi-tenant cloud data center. In an overlay network, data traffic between tenants is tunneled across the underlying data center's internet protocol (IP) network. Overlay networks can employ a number of different protocols, such as Virtual Extensible LAN (VX-LAN), Network Virtualization using Generic Routing Encapsulation (NVGRE), Stateless Transport Tunneling (STT), Generic Network Virtualization Encapsulation (GE-NEVE), Multiprotocol Label Switching (MPLS) over User Datagram Protocol (UDP), etc., to tunnel traffic across an underlay network.

To create a tunnel, such protocols generally encapsulate one packet inside of another packet in order to extend the virtual network traffic over the underlying physical network. VXLAN, for example, is an overlay protocol that encapsulates layer 2 (L2) traffic (e.g., Ethernet frames) within UDP packets. Traffic that passes through the underlay physical network is generally independent of the overlay network. That is, the physical devices in the underlay network route the encapsulated packets based on the outer internet protocol (IP) address header. By creating tunnels on the underlay physical network, overlay protocols can decouple a network service (e.g., such as an L2 or layer 3 (L3) service) provided to tenants from the underlying network infrastructure across which the tenants communicate.

Such tunnels are typically created between network endpoints (e.g., virtual tunnel endpoints (VTEPs)) on network virtualization edges (NVEs), which are entities that reside at the boundary of the overlay network. The network facing side of the NVE uses the underlay network (e.g., L3 network) to tunnel tenant frames to and from other NVEs. The tenant facing side of the NVE sends and receives traffic (e.g., L2 traffic, L3 traffic, etc.) to and from different tenant systems connected to one or more virtual networks. An NVE can be implemented as part of a virtual device (e.g., a virtual switch within a hypervisor), physical device (e.g., physical switch or router), a network server appliance, etc.

SUMMARY

One embodiment presented herein describes a method for generating entropy values for packets in an overlay network existing on top of an underlay network. The method generally includes generating a first entropy value for each packet in a first group of packets received in a sequence of packets from a host, and detecting an idle amount of time between the first group of packets in the sequence of packets and a second group of packets in the sequence of packets received from the host. The method also includes upon determining that the idle amount of time is greater than a first threshold, generating a second entropy value for each packet in the second group of packets from the host. The method further includes inserting the second entropy value in an outer header of each packet in the second group of packets, and transmitting the second group of packets to the underlay network.

Other embodiments include, without limitation, a computer program product that includes a storage medium having computer-readable program code that enables a processing unit to implement one or more aspects of the disclosed methods as well as a system having a processor, memory, and application programs configured to implement one or more of the disclosed methods.

DETAILED DESCRIPTION

Figure 1:
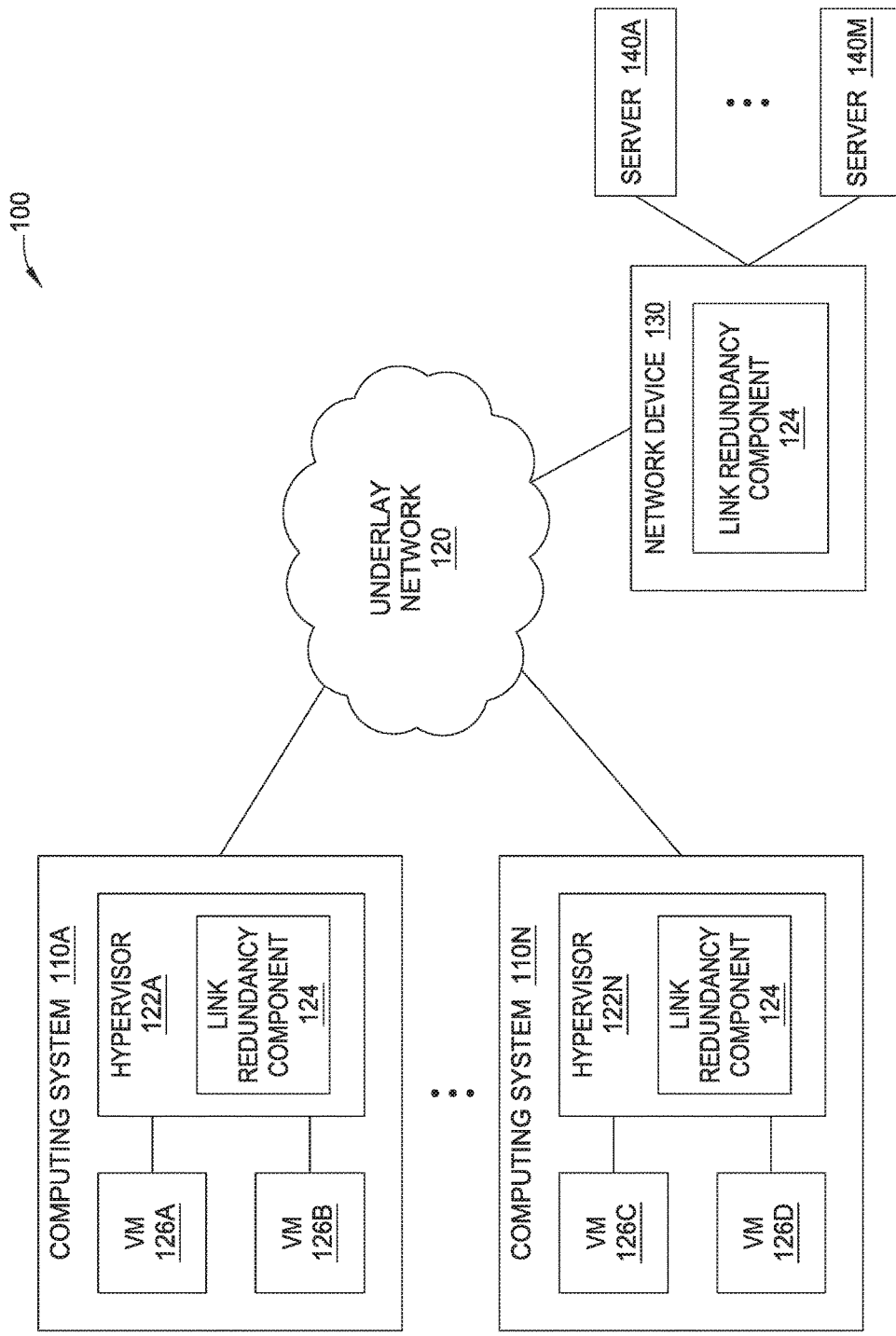
FIG. 1 illustrates an example computing environment that includes one or more link redundancy components configured to generate varying entropy values for overlay packets tunneled across an underlay network, according to one embodiment.

Embodiments presented herein provide techniques for exploiting the link redundancy of an underlay network for packets that are tunneled across the underlay network.

For example, traffic that passes through the underlay physical network can be distributed across multiple paths. The underlay physical devices generally use load balancing techniques (e.g., such as Equal-cost multipath (ECMP), virtual link aggregation groups (vLAGs), etc.) to balance the traffic load among multiple paths. Such load balancing is typically done on a flow basis (e.g., each device to device communication). Thus, to account for the traffic flow between a pair of NVEs having the same source and destination IP addresses and underlay devices making routing decisions (e.g., using ECMP, vLAG, etc.) on the basis of the outer IP headers, overlay protocols attempt to introduce a level of entropy for the load balancing. For example, many overlay protocols generally convey the entropy of the inner header (e.g., of the encapsulated packet) in the outer header for underlay deices to use when making multipath decisions in the underlay network.

However, while such overlay protocols introduce a level of entropy for load balancing decisions, they do not fully exploit the link redundancy in the underlay network. For example, such overlay protocols typically generate a static hash of the inner header fields and fill the hashed value into one of the outer header fields for each traffic flow. VXLAN and GENEVE, for example, use the outer UDP source port to carry the entropy (e.g., a hashed value) of the inner header. STT uses the outer transmission control protocol (TCP) source port number from the range 49152-65535 to carry the entropy (e.g., random hash) of the inner header. Due to the static hash, traffic flows that have the same source and destination NVE still have a greater likelihood of being routed to the same underlay link, which can cause traffic imbalances in the underlay network.

Embodiments presented herein provide an improved load balancing technique (e.g., compared to conventional load balancing techniques) that allows underlay devices to fully exploit the link redundancy in an underlay network. More specifically, embodiments use a dynamic hashing mechanism to adjust the entropy values (e.g., hashed values) of encapsulated packets (for different bursts of packets within a traffic flow) and convey the entropy values to underlay devices for multiple path load balancing.

In one embodiment, a link redundancy (LR) component is configured to detect whether a packet received from a host (e.g., VM, physical switch, etc.) at a NVE belongs to a long-lived traffic flow. A long-lived traffic flow (or elephant flow), for example, can refer to a traffic flow with an extremely large amount of data (e.g., from several hundred megabytes (MBs) to gigabytes (GBs) or larger). Such long-lived traffic flows may occupy a disproportionate share of the total bandwidth in the network. As described below, such a long-lived traffic flow may be split into several bursts (or groups) of packets (referred to herein as "flowlets"), where each burst of packets (or flowlet) within the flow is separated by an idle gap (or time interval). The LR component is configured to detect such idle time periods between the flowlets and adjust the entropy values for the packets in the different flowlets. That is, for a given traffic flow, the LR component can generate a different entropy (or hash) value for overlay packets within different flowlets and use the different entropy values in the outer IP headers of the respective overlay packets that are routed across the underlay network.

Additionally, in some embodiments, the LR component is configured to adjust entropy values for packets (within a traffic flow) if the LR component determines that the number of packets that are successfully received in-sequence satisfies a predetermined threshold (e.g., notwithstanding whether the LR component has identified an idle time period). For example, as described below, in some cases, a given traffic flow may be able to tolerate some threshold amount of packet reordering without adversely affecting the performance of the transmission and delivery of packets. In such cases, the LR component can monitor the status of successful packet deliveries and, upon determining that the number of successful packets received is above a threshold, trigger a re-ordering of the packets by adjusting the entropy value that is used in the overlay packet.

Advantageously, the LR component described herein can generate varying entropy values for packets within a flow (e.g., as opposed to using a static hash for a flow), which allow underlay devices to more efficiently balance the traffic load across the multiple paths in an underlay network. Note that many of the following embodiments use data center network virtualization overlays (NVO3) as a reference example of a tunneling architecture in which the techniques presented herein can be used to improve load balancing of data traffic across links in an underlay network. Those of ordinary skill in the art, however, will recognized that the technique described herein can also be applied to other types of tunnel forwarding architectures for overlay networks. Further, note that many of the embodiments may use VXLAN as a reference example of an overlay protocol in which the techniques presented herein may be applied. However, note that the techniques presented herein can be applied to other overlay protocols, such as MPLS over UDP, STT, GENEVE, NVGRE, and the like.

FIG. 1 illustrates an example of a computing environment 100 configured to generate varying entropy values for overlay packets tunneled across an underlay network, according to one embodiment. As shown, the computing environment 100 includes computing systems 110A-110N connected to an underlay network 120. In one embodiment, the underlay network 120 is an IP-based packet network that employs a leaf-spine architecture (e.g., leaf and spine switches). Computing systems 110A-N are included to be representative of any kind of physical computing system, such as a desktop computer, laptop computer, server computing system, and the like. In one embodiment, computing systems 110A-N may be located in a data center or cloud environment with multiple computing systems.

Each computing system 110 may include a NVE that sends and receives traffic from one or more hosts (e.g., virtual machines (VMs) 126) hosted on the computing systems 110. In one embodiment, the NVE is implemented (e.g., in software) as a hypervisor switch 122 on the computing system 110. The hypervisor 122 is generally an intermediary between the VMs 126 and the hardware in the computing system 110. For example, the hypervisor 122 can manage physical resource allocation and access physical resources (e.g., such as processors, I/O, memory, etc.) on behalf of a given VM 126. The computing systems 110 may spawn, using the hypervisor 122, a number of VMs 126 that can belong to a number of independent entities (e.g., enterprises, organizations, individual users, etc.). Each VM 126 hosted in a given computing system 110 can run an independent operating system in order to execute one or more applications (or processes). Examples of operating systems include versions of the UNIX operating system (such as the AIX operating system), versions of the Microsoft Windows operating system, and distributions of the Linux operating system. (UNIX is a registered trademark of The Open Group in the United States and other countries, or both. Linux is a registered trademark of Linus Torvalds in the United States, other countries, or both). More generally, any operating system supporting the functions disclosed herein may be used.

As shown, the computing environment 110 also includes a network device 130 connected to the underlay network 120. In one embodiment, the NVE can be implemented in hardware as a physical network device 130. For example, network device 130 is included to representative of a physical network device (e.g., such as a hardware switch, router, etc.). In one embodiment, network device 130 is a top-of-rack (ToR) switch that is connected to multiple servers 140A-M. One or more of the servers 140A-M may communicate with one or more VMs 126 via the underlay network 120.

In one embodiment, the NVEs (e.g., the hypervisors 122A-N, network device 130) are configured to establish tunnels over the underlay network 120. The hypervisors 122 can use one or more overlay protocols (e.g., such as VXLAN, MPLS over UDP, GENEVE, etc.) to create the tunnels on the underlay network 120. In one example, the hypervisor 122A can add overlay encapsulation headers to packets received from VMs 126A-B (that are destined for VMs 126C-D) and send the encapsulated packets over the underlay network 120 to hypervisor 122N. Once received, the hypervisor 122N can strip off the encapsulation headers and deliver the original packets to the VMs 126C-D.

As noted, however, while NVEs can use such protocols for overlay tunnel encapsulation, such protocols do not fully exploit the link redundancy in the underlay network topology. For example, assume VM 126A on computing system 110A sends a first large volume traffic flow to VM 126C on computing system 110N and VM 126B on computing system 110A sends a second large volume traffic flow to VM 126D on computing system 110N. In this example, each packet that the hypervisor 122A encapsulates in the first and second traffic flows will have the same source and destination endpoints, and thus the same outer MAC and IP headers. As noted, however, while hypervisor 122A (as part of an overlay protocol) can use a static hash of the inner headers (as part of the outer header) in order to distinguish the two traffic flows, the packets from the first and second flows still have a great likelihood of traversing through the same links in the underlay network 120, resulting in a traffic imbalance on the underlay network links. Moreover, in some cases, even if there is not a hash collision, a small number of traffic flows contributing to most of the traffic in the underlay network can also cause a traffic imbalance in the underlay network.

To overcome the traffic imbalance that may be caused by using a static hash, embodiments can configure the NVEs (e.g., hypervisors 122, network device 130, etc.) to use the LR component 124 to generate a varying entropy value for different groups of packets (or flowlets) in a traffic flow. The computing environment 100, for example, may be a part of a data center network that supports a diverse set of workloads, and where large throughput-sensitive flows for video, big data analytics, VM migrations, VM image traffic, etc., may share the network with latency sensitive flows such as search, remote procedure calls (RPCs), gaming, etc. Most of the traffic within such a network may be transmitted using TCP. Due, in part, to the burstiness characteristic of TCP traffic, a given TCP traffic flow may be split into multiple bursts of packets (or flowlets) that are separated by an idle time interval.

Figure 2:
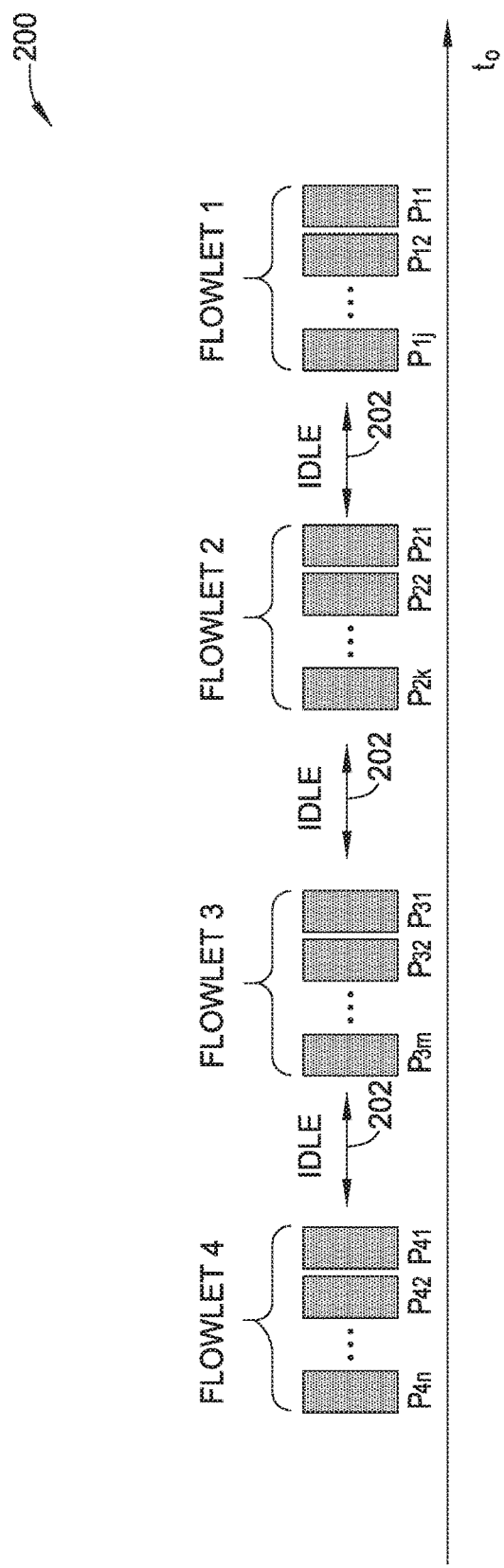
FIG. 2 illustrates an example of a traffic flow split into multiple flowlets (e.g., groups of packets), according to one embodiment.

FIG. 2 illustrates one example of a TCP flow 200 that is split into multiple flowlets. As shown, TCP flow 200 is split into flowlets 1-4, and each flowlet 1-4 includes a group of packets. For example, flowlet 1 includes a first group of packets ($p_{11}$ to $p_{1j}$), flowlet 2 includes a second group of packets ($p_{21}$ to $p_{2k}$), flowlet 3 includes a third group of packets ($p_{31}$ to $p_{3m}$) and flowlet 4 includes a fourth group of packets ($p_{41}$ to $p_{4n}$). An idle period (or time interval) 202 may exist between the last packet of the previous flowlet (e.g., flowlet 1) and the first packet of the subsequent flowlet (e.g., flowlet 2). In some cases, the amount of time in the idle periods 202 may be large enough such that subsequent flowlets (e.g., flowlets 2-4) can be routed differently in the underlay network without packet reordering.

In some embodiments, the LR component 124 can be configured to monitor the idle periods 202 between flowlets of a traffic flow. That is, referring again to FIG. 1, the LR component 124, for each group of packets that are received from a host (e.g., VM 126A) and destined for another host (e.g., VM 126C), can monitor the time intervals between the last packet of a previous flowlet and the first packet of the subsequent flowlet. If the LR component 124 determines that the amount of time for a given idle period satisfies a predetermined threshold, the LR component 124 can generate a different entropy value for the packets in the subsequent flowlets of the traffic flow. For example, if the LR component 124 determines that the amount of time that has elapsed since a flowlet was received from a host is greater than a threshold, the LR component 124 can generate another entropy value for the outer headers of the packets in subsequent flowlets. Doing so allows underlay devices to fully exploit the link redundancy in the underlay network.

Note FIG. 1 illustrates merely one reference example of a computing environment 100 configured to generate varying entropy values for overlay packets tunneled across an underlay network. Those of ordinary skill in the art will recognize that other configurations of the computing environment 100 may be adapted to generate varying entropy values for overlay packets.

Figure 3:
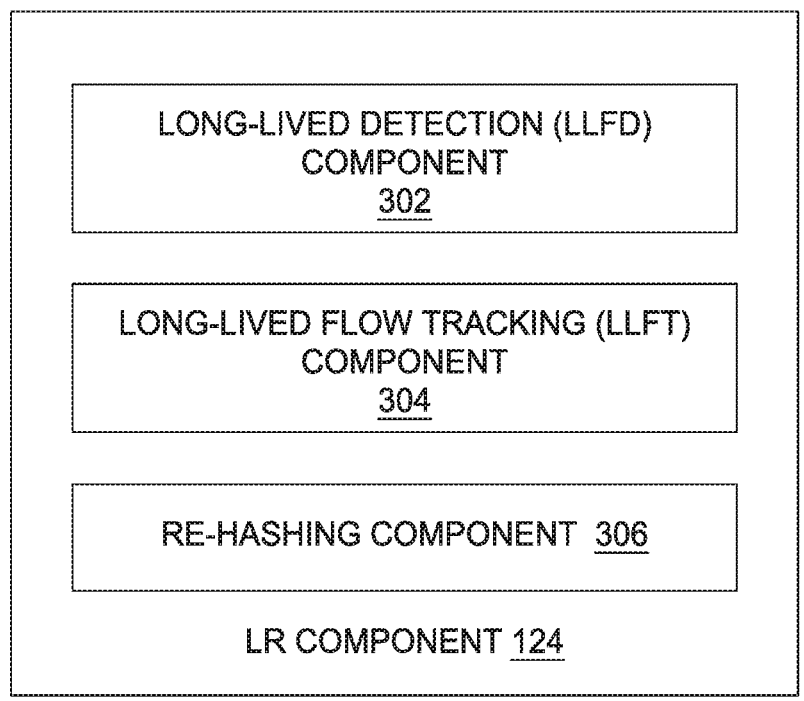
FIG. 3 further illustrates the link redundancy component, according to one embodiment.

FIG. 3 further illustrates the LR component 124, described relative to FIG. 1, according to one embodiment. The LR component 124 may be software, hardware, or combinations thereof. As shown, the LR component 124 includes a long-lived (LL) flow detection (LLFD) component 302, a LL flow tracking (LLFT) component 304, and a re-hashing component 306. In one embodiment, the LR component 124 can use the LLFD component 302 to detect long-lived lived traffic flows. As noted, a long-lived traffic flow may be a traffic flow transmitted from one host (e.g., VM 126A) to another host (e.g., VM 126C) that is characterized by a large amount of data (or bytes). In some networks (e.g., a data center network), such long-lived traffic flows may contribute to the majority of data traffic in the network, and at the same time account for a small portion of the traffic flows in the network. In some cases, for example, long-lived traffic flows may account for 1% of the traffic flows in a data center network, while at the same time contributing to more than 90% of the traffic in the data center network. Thus, by detecting such long-lived traffic flows, the LR component 124 may be able to improve the load-balancing of the majority of traffic that is routed across the underlay network.

Figure 4:
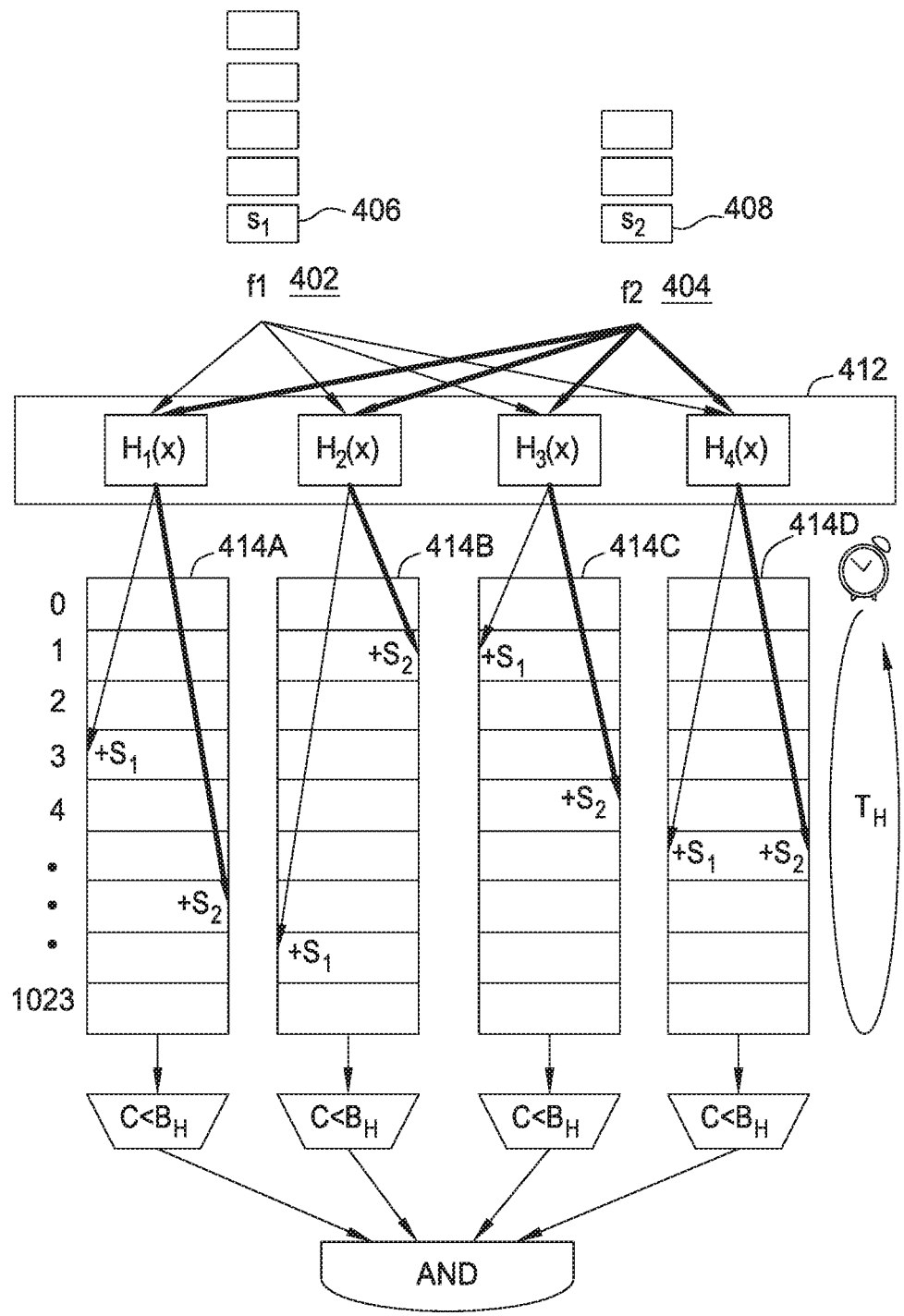
FIG. 4 illustrates an example algorithm for detecting long-lived traffic flows, according to one embodiment.

In one embodiment, the LLFD component 302 can use a heavy-hitter multi-stage filter algorithm to detect long-lived traffic flows. As part of such algorithm, the LLFD component 302 may maintain one or more flow detection tables for counting the size of packets. As shown in one reference implementation of such an algorithm in FIG. 4, the LLFD component 302 may include four long-lived traffic flow detection tables 414A-D. In this example, each of the four tables 414A-D includes 1024 counters for tracking the size of one or more packets. The LLFD component 302 may index each received packet into the detection tables via different hash functions, and increment the counters at each detection table based on the hashed packet size. For example, as shown in FIG. 4, the LLFD component 302 receives a packet 406 from a first flow (f1) 402 and a packet 408 from a second flow (f2) 404. Once received, the LLFD component 302 indexes the packets into the tables 414A-414D via the hash functions 412. The LLFD component 302 may then increment the counters at each detection table 414 based on the output of the hash functions 412. For example, in detection table 414A, the counter for packet 406 is incremented to a value of three, and the counter for packet 408 is incremented to a different value. In this manner, the LLFD component 302 may increment the counters (at each detection table) for each packet to different values based on the output of the hash functions.

If the LLFD component 302 determines that the counters from each detection table 414 satisfies a predetermined size threshold, the LLFD component 302 may determine that the packet belongs to a long-lived traffic flow. Thus, continuing with the example shown in FIG. 4, if the LLFD component 302 determines that the counters at all four detection tables 414A-D for packet 406 or packet 408 exceed a size threshold $B_H$, the LLFD component 302 can classify flow 402 or flow 404 as a long-lived traffic flow. In some embodiments, when implementing this algorithm, the LLFD component 302 may reset the counters to zero at every defined time interval (e.g., $T_H$ interval). The LLFD component 302 may configure $B_H$ and $T_H$ based on the desired level of performance for tracking long-lived traffic flows. Note that FIG. 4 illustrates a multi-stage filter algorithm as merely a reference example of a type of algorithm that the LLFD component 302 can use to detect long-lived traffic flows. Note, however, that the LLFD component 302 can use a variety of other techniques to detect long-lived traffic flows, examples of which include, but are not limited to, using per-flow rules and statistics, packet sampling and picking algorithm (e.g., flows being sampled with high frequency will be considered as the candidates of long-lived flows), etc.

Referring back to FIG. 3, if the LR component 124 determines (via the LLFD component 302) that a packet belongs to a long-lived traffic flow, the LR component 124 can add the identified flow to (a flow state table in) the LLFT component 304 and use the LLFT component 304 to track the state of each identified long-lived traffic flow. For example, the LLFT component 304 may include a flow state table (e.g., flow state table 504 shown in FIG. 5) that maintains the state of each long-lived traffic flow. The flow state table may include one or more flow entries that are used to track the long-lived traffic flows. For example, in one embodiment, each flow entry can include match fields (for matching a packet to a flow entry), a hash function selector, age flag, and a packet counter.

The LLFT component 304 can use the match fields to match flow entries against the packets received in a long-lived traffic flow. For example, in one embodiment, the match fields may include the 5-tuple, e.g., source IP address and port, destination IP address and port, and protocol, associated with a given traffic flow. The hash function selector is generally an index that indicates which hash function should be selected to generate an entropy value for the packet. The age flag indicates if a particular flow entry is idle for a predetermined threshold $T_a$. $T_a$, for example, may correspond to the amount of time it takes to detect an idle period (e.g., idle period 202) between flowlets. The LLFT component 304 can clear the age flag each time the LLFT component 304 determines that an incoming packet received at an NVE (e.g., from a host) matches a flow entry (e.g., the match fields) in the flow state table. On the other hand, the LLFT component 304 can set the age flag if the LLFT component 304 determines that there no packets that match a flow entry in the flow state table for a period of $T_a$. The LLFT component 304, for example, may set the age flag to indicate that an idle period 202 (between flowlets) has been detected. The LLFT component 304 can use the packet counter to count the number of times a packet received at a NVE matches a flow entry in the flow state table. For example, the LLFT component 304 can increment the packet counter by one for each matched packet.

In one embodiment, once the LLFT component 304 sets the age flag for a flow entry, the LLFT component 304 may delete the flow entry from the flow state table if the LLFT component 304 does not detect another matched packet in another period of $T_a$. Doing so allows the LLFT component 304 to remove flow entries from the flow state table that may have ended or been completed, and therefore save space in the flow state table.

In some cases, the LLFT component 304 may admit flow entries (into the flow state table) that the LLFD component 302 determines are long-lived traffic flows but actually are not long-lived traffic flows. Stated differently, the LLFD component 302 may false identify one or more short-lived traffic flows (e.g., traffic flows characterized by a small amount of data) as long-lived traffic flows. Embodiments presented herein provide techniques for evicting false positive long-lived traffic flows from the flow state table.

For example, in one embodiment, the flow state table may also include a byte counter field, which the LLFT component 304 can use to count the size (e.g., in bytes) of packets that match a flow entry. The LLFT component 304 can increment the byte counter field by the size of each matched packet, and use the byte counter field to determine whether to evict a flow entry from the flow state table (e.g., determine if the number of bytes associated with a flow is large enough to be considered a long-lived traffic flow). For example, the LLFT component 304 can clear the byte counter field every period of $T_H$. When the LLFT component 304 starts to receive packets for a flow entry, the LLFT component 304 can monitor the number of bytes received (within a multiple period of $T_H$) to determine if the flow entry belongs in the flow state table. For example, in one implementation, if the LLFT component 304 determines that the number of bytes associated with the flow entry is less than a determined size threshold $B_H$ bytes in two consecutive periods of $T_H$ (or some other period of $T_H$), the LLFT component 304 may determine that such flow entry was mistakenly identified as a long-lived traffic flow and delete the flow entry from the flow state table.

The LR component 124 can use the re-hashing component 306 to determine when to regenerate an entropy value for an incoming packet (e.g., from a host, such as a VM, server, etc.). In one embodiment, the re-hashing component 306 may determine to generate another entropy value for an incoming packet if it determines that the amount of time that has elapsed since a previous packet was received is greater than a threshold (e.g., $T_a$). Put differently, if the re-hashing component 306 detects the idle period between two flowlets (e.g., flowlet 1 and flowlet 2 in FIG. 2), the re-hashing component 306 may generate another entropy value for overlay packets in the incoming flowlet (e.g. flowlet 2), such that when the underlay network receives the incoming flowlet, these packets will have a greater likelihood of being routed through a different link than packets from the previous flowlet (e.g., flowlet 1). To do so, the re-hashing component 306 may use the age flag (described above) to detect the idle periods between flowlets. For example, if the re-hashing component 306 determines the age flag is set (i.e., indicating that a long-lived traffic flow has idled for an interval larger than $T_a$), the re-hashing component 306 can generate another entropy value to use in the outer headers for the incoming overlay packets destined for the underlay network.

Alternatively, or additionally, in one embodiment, the re-hashing component 306 can determine to generate another entropy value for an incoming packet if the re-hashing component 306 determines that the number of packets that are received in-sequence satisfies a predetermined threshold. In some cases, for example, a TCP transmission may be able to tolerate packet re-ordering by incorporating a certain amount of packets in a receiving buffer. In addition, the TCP performance may not be adversely affected if the number of packet re-orders is below a certain percentage. For example, in some cases, application throughput may not be degraded if the packet reordering rate is less than 1 out of every 1000 packets (e.g., 0.1%). In other cases, the application throughput may not be degraded if the packet re-ordering rate is less than 1 out of every 100 packets (e.g., 1%).

According to embodiments herein, the re-hashing component 306 may use a re-ordering diameter F, which represents the number of in-sequence delivery packets between two adjacent out-of-sequence deliveries, to determine how often a flow can be re-ordered without causing undue harm (e.g., reducing throughput) to TCP performance. For example, in cases where the LR component 124 determines TCP performance will not degrade if the packet re-ordering rate is less than 1 out of every 1000 packets, F may be equal to 1000. In cases where the LR component 124 determines TCP performance will not degrade if packet re-ordering rate is less than 1 out of 100 packets, F may be equal to 100. The re-hashing component 306 may use the packet counter (in the flow state table) to determine if the number of packets that hit a flow entry satisfies the threshold F. For example, each time the re-hashing component 306 determines the packet counter reaches a multiple of F, the re-hashing component 306 can generate another entropy value to use in the outer headers for the incoming overlay packets destined for the underlay network. In this manner, embodiments can generate varying entropy values for different groups of packets in a traffic flow in order to fully exploit the underlay network link redundancy.

Figure 5:
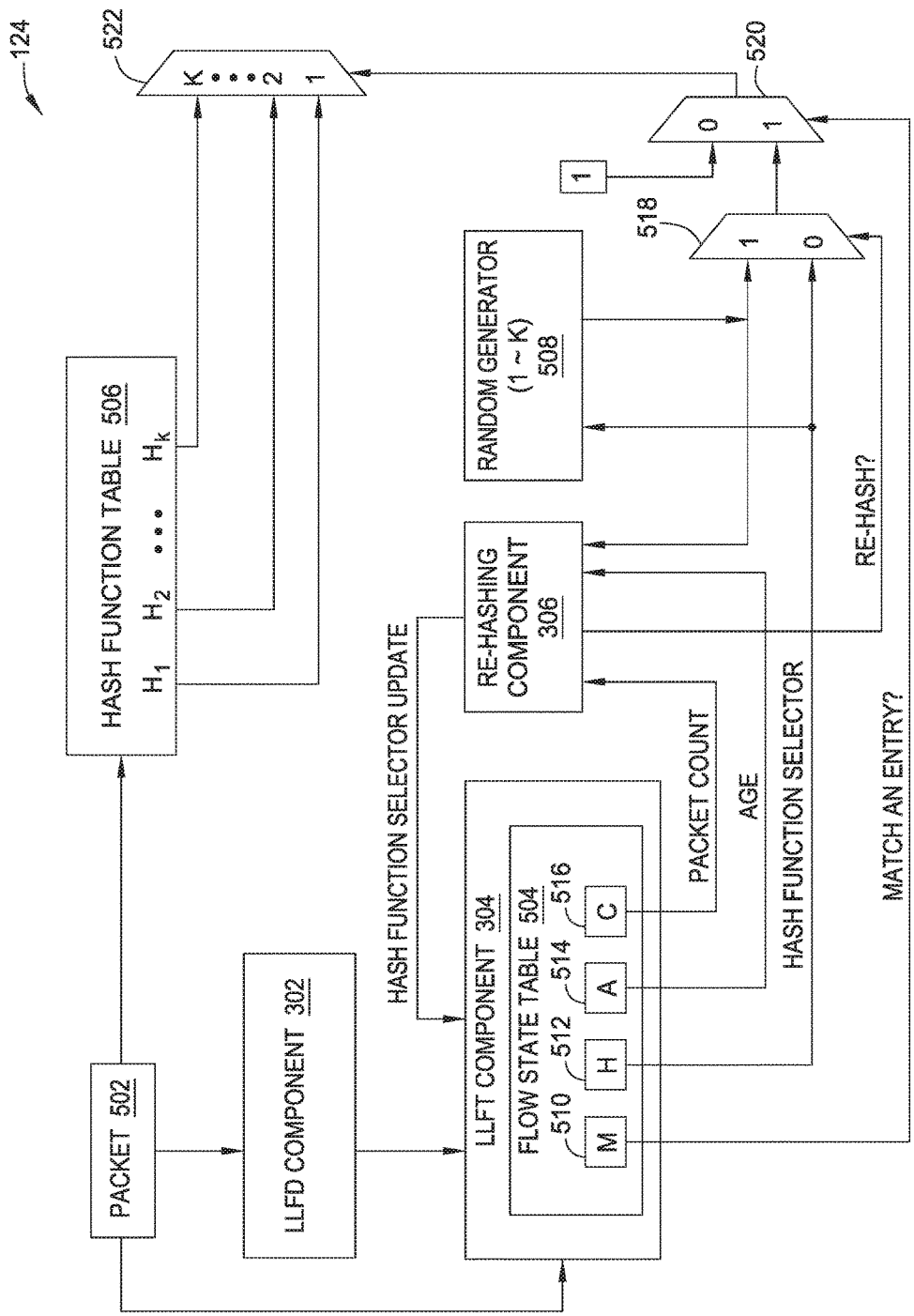
FIG. 5 illustrates an example of the link redundancy component generating varying entropy values for overlay packets tunneled across an underlay network, according to one embodiment.

FIG. 5 illustrates one example of how the LR component 124 can be configured to generate varying entropy values for overlay packets tunneled across an underlay network, according to one embodiment. As shown in this example, the LR component 124 includes the LLFD component 302, LLFT component 304, re-hashing component 306, hash function table 506, random generator 508 and selectors 518-522.

As shown, the hash function table 506 may include k number of hash functions for generating entropy values that can be placed in the outer header of the overlay packets that the NVEs tunnel across the underlay network 120. For example, using VXLAN as a reference example, the LR component 124 can use one of the hash functions ($H_1 \ldots H_k$) in hash function table 506 to compute a hash of the inner frame's header fields (e.g., L2 or Ethernet frame header), and use the computed hash as the UDP source port for the UDP header. In one embodiment, the LR component 124 may use $H_1$ as a default (or static) hash function.

The LR component 124, therefore, may determine it has k choices of hash functions to choose from for generating an entropy value for the incoming packet 502 (received from a host). In this example, the output of selector 520 provides the control input to selector 522 to determine which of the multiple of the hash functions ($H_1 \ldots H_k$) the LR component 124 uses to generate the entropy value for the packet 502. At the same time, the LLFT component 304 receives the packet 502 and outputs four values from the flow state table 504: match flag 510, hash function selector flag 512, age flag 514 and packet count 516. As noted, match flag 510 indicates whether packet 502 matches a long-lived traffic flow entry in the flow state table 504, hash function selector 512 indicates which hash function (e.g., $H_1 \ldots H_k$) should be selected to generate the entropy value for packet 502, age flag 514 indicates whether a flowlet idle interval has been met, and packet count indicates the number of packet matches for the particular flow entry.

In one embodiment, if the m flag 510 returned from the flow state table 504 is false (i.e., indicating that the packet is in a short-lived flow), selector 520 outputs a control signal equal to one, and selector 522, in turn, selects $H_1$ to generate the entropy value. Thus, if the LR component 124 determines that a packet belongs to a short-lived traffic flow, the LR component 124 will use the static hash to compute the entropy values for each packet in the short lived traffic flow. On the other hand, if the m flag 510 returned from the flow state table 504 is true (i.e., indicating that the packet is in a long-lived traffic flow), selector 520 outputs a control signal equal to input 1 (of selector 520), which is equal to the output of selector 518. The selector 520 outputs this control signal (equal to the output of selector 518) to selector 522 which selects the hash function from $H_1, \ldots, H_k$ based on the control signal.

When the re-hash signal from the re-hashing component 306 is false, the selector 518 selects the hash function saved in the flow state table 504. On the other hand, if the re-hash signal from the re-hashing component 306 is true (or asserted), the selector 518 selects a hash function corresponding to the input from the random generator 508. For example, the random generator 508 may generate a random number between 1 and k (corresponding to one of the k hash functions available in the hash function table 506). In some cases, the LLFT component 304 can feedback the hash function selector to the random generator 508 to prevent the random generator 508 from generating a random number that corresponds to the saved hash function selector. In one embodiment, the re-hashing component 306 can raise (or assert) the re-hash signal if the re-hashing component 306 determines the age flag 514 is set. In one embodiment, the re-hashing component 306 can assert the re-hash signal if the re-hashing component 306 determines the packet count 516 is greater than F. The re-hashing component 306 can also feedback the selected hash function to the LLFT component 304 in order to update the hash function selector 512 in the flow state table 504.

Note that FIG. 5 illustrates merely one example of how the LR component 124 can be configured to generate varying entropy values for overlay packets tunneled across an underlay network. Those of ordinary skill in the art, however, will recognized that the LR component 124 may be adapted in other configurations in order to generate varying entropy values. Further, while the techniques presented herein are applied to long-lived traffic flows, note that the LR component 124 can also be configured to generate varying entropy values for other types of traffic flows. Thus, the embodiments herein do not require that the LR component 124 always generate a different entropy value for packets belonging to long-lived traffic flows.

Figure 6:
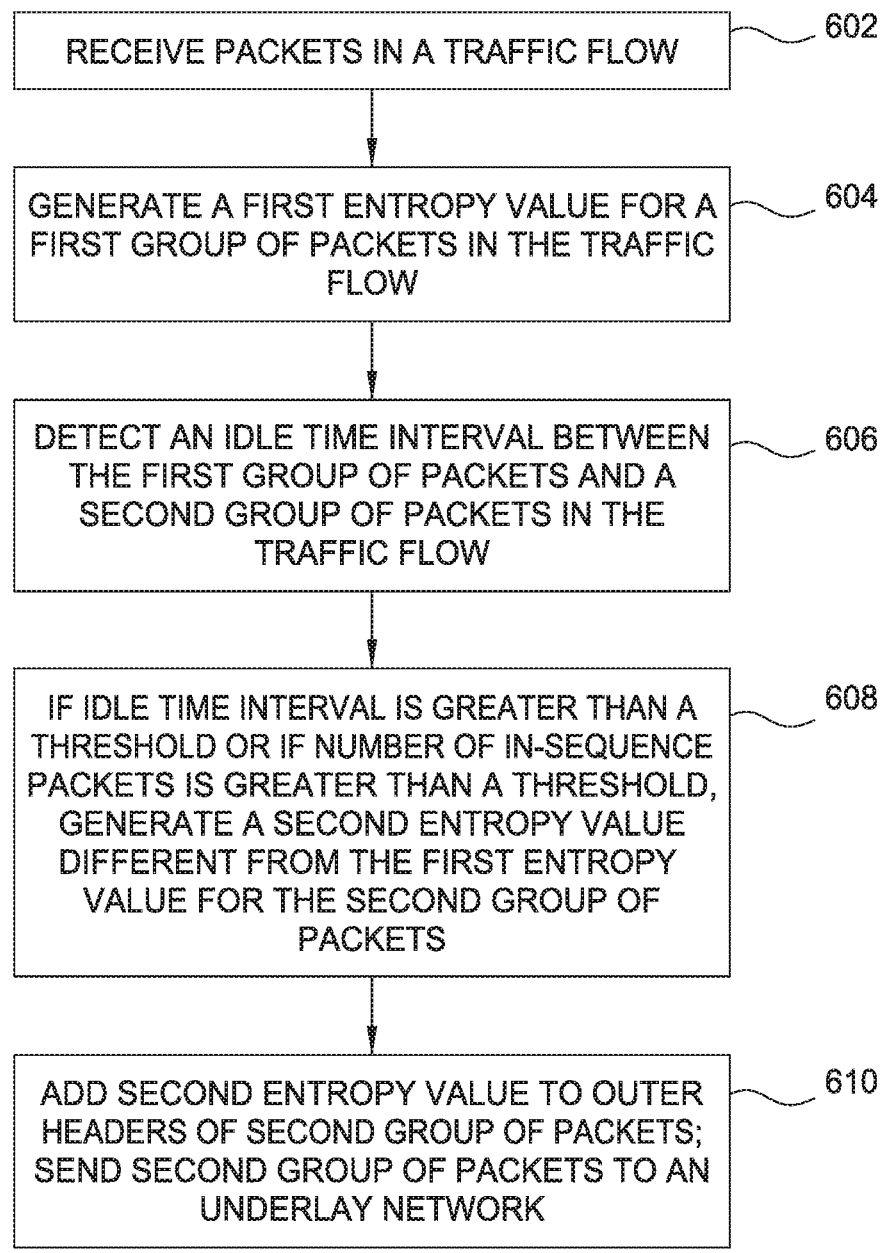
FIG. 6 illustrates a method for generating varying entropy values for overlay packets tunneled across an underlay network, according to one embodiment.

FIG. 6 illustrates a method 600 for generating varying entropy values for overlay packets tunneled across an underlay network, according to one embodiment. As shown, the method 600 begins at block 602 where the LR component 124 begins to receive packets in a traffic flow. The traffic flow, for example, may be a long-lived traffic flow. At block 604, the LR component 124 generates a first entropy value for a first group of packets (or first flowlet) in the traffic flow. At block 606, the LR component 124 detects an idle time interval between the first group of packets and a second group of packets in the traffic flow. If the LR component 124 determines the idle time interval is greater than a threshold or determines the number of in-sequence packets is greater than a threshold, the LR component 124 generates a second entropy value different from the first entropy value for the second group of packets. At block 610, the LR component 124 adds the second entropy value to the outer headers of the second group of packets and sends the second group of packets to an underlay network.

Figure 7:
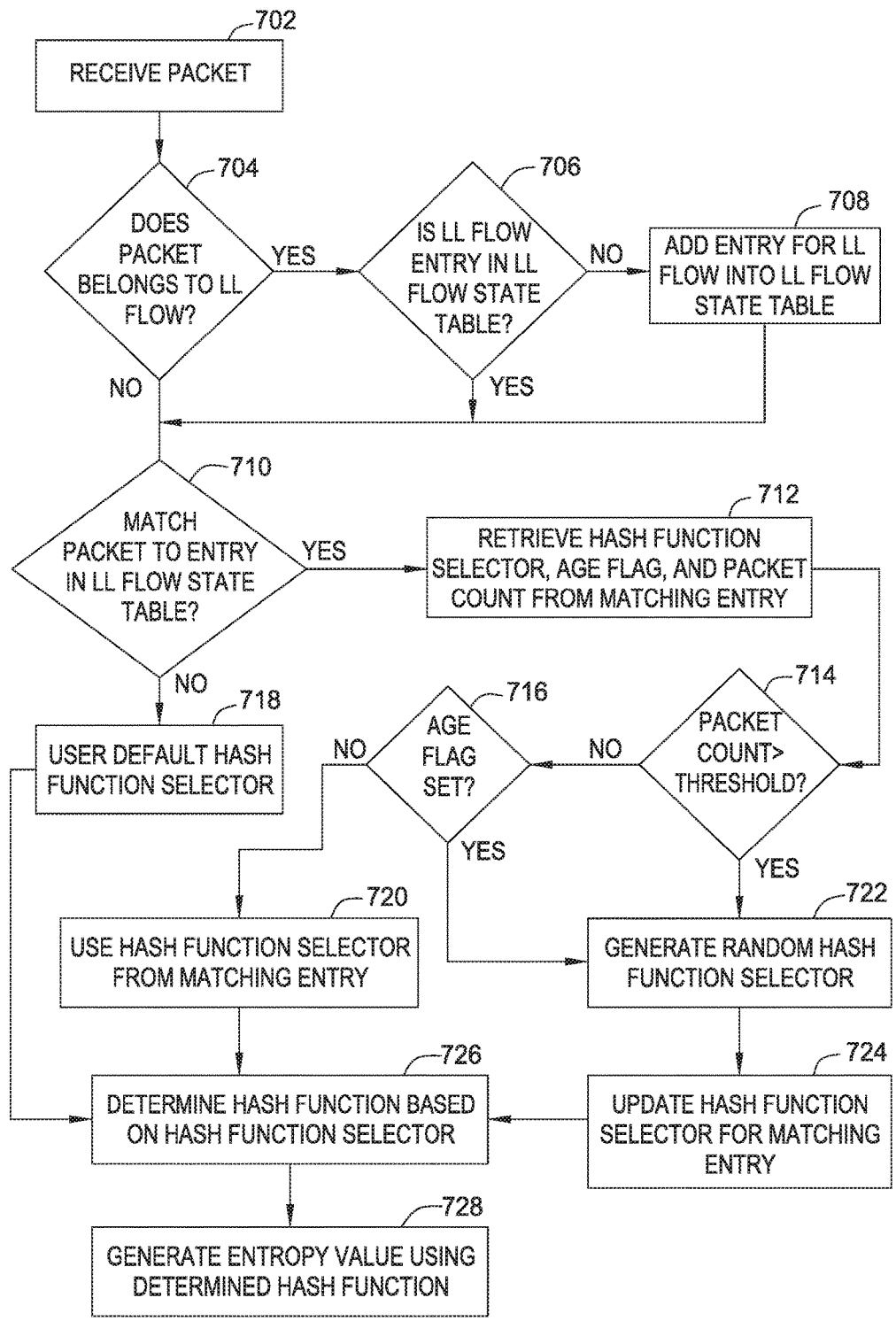
FIG. 7 further illustrates steps of a method for generating varying entropy values for overlay packets tunneled across an underlay network, according to one embodiment.

FIG. 7 illustrates a method 700 for generating varying entropy values for overlay packets tunneled across an underlay network, according to one embodiment. As shown, the method 700 begins at block 702, where the LR component 124 receives a packet. Such packet may be received from a host (e.g., a VM 126, server 140 connected to a network device 130, etc.) at a NVE (e.g., hypervisor 122, physical switch or router 130, etc.) where the LR component 124 is located, and may be destined for another host. At block 704, the LR component 124 determines if the packet belongs to a long-lived traffic flow. If so, at block 706, the LR component 124 determines if there is a long-lived traffic flow entry (corresponding to the received packet) in the long-lived flow state table. If not, the method proceeds to block 710. If the LR component 124 determines there is no flow entry in the flow state table (block 706), the LR component 124 adds an entry for the long-lived traffic flow into the long-lived flow state table (block 708). On the other hand, if the LR component 124 determines there is a flow entry in the flow state table (block 706), the method proceeds to block 710.

At block 710, the LR component 124 determines if the received packet matches an entry in the flow state table. If so, the LR component retrieves the hash function selector, age flag, and packet count from the matching entry (block 712). The LR component 124 then determines if the packet count is greater than a threshold (e.g., threshold F) (block 714). If the LR component 124 determines the packet count is greater than a threshold, the LR component 124 generates a random hash function selector (block 722). At block 724, the LR component 124 updates the hash function selector for the matching entry.

If, at block 714, the LR component 124 determines the packet count is not greater than a threshold, the LR component 124 determines if the age flag is set (block 716). If so, the method proceeds to block 722. If not, the LR component 124 uses the hash function selector from the matching entry (e.g., in the flow state table) (block 720). If, at block 710, the LR component 124 does not match the packet to an entry in the flow state table (e.g., the packet may belong to a short-lived traffic flow), the LR component 124 uses the default hash function selector (block 718). Such default hash function selector may correspond to a static hash function. From blocks 718, 720 and 724, the method proceeds to block 726 where the LR component 124 determines the hash function based on the hash function selector. At block 728, the LR component 124 generates an entropy value using the determined hash function.

Advantageously, generating a varying entropy value using the techniques presented herein can help underlay devices improve multi-path load balancing (e.g., in order to fully exploit the link redundancy in the underlay network). The techniques do not require changes to the overlay protocol header fields, and thus, can be compatible with a variety of different overlay protocols. Further, the techniques presented herein can be easily adopted by existing overlay based cloud networks. For example, NVEs can use the techniques presented herein to improve the balancing effect on the underlay network links without requiring modification to the load balancing scheme implemented by underlay devices in the underlay network. Additionally, in some cases, NVEs can use the techniques herein without introducing additional communication overhead between NVEs and underlay devices.

Figure 8:
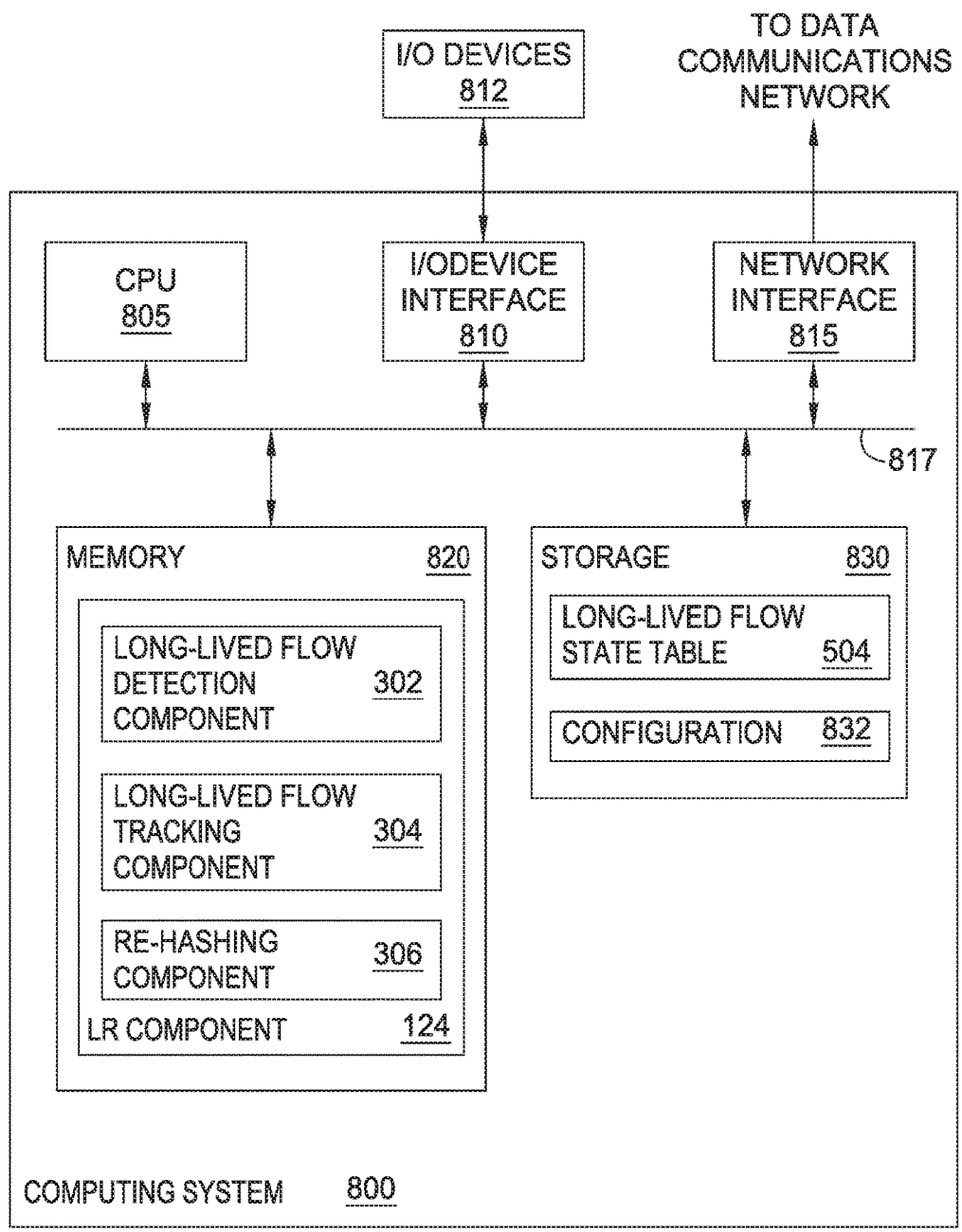
FIG. 8 is a block diagram of a computing system configured to generate varying entropy values for overlay packets tunneled across an underlay network, according to one embodiment.

FIG. 8 illustrates an example computing system 800 configured to generate varying entropy values for overlay packets tunneled across an underlay network, according to one embodiment. As shown, the computing system 800 includes, without limitation, a central processing unit (CPU) 805, a network interface 815, a memory 820, and storage 830, each connected to a bus 817. The computing system 800 may also include an I/O device interface 810 connecting I/O devices 812 (e.g., keyboard, display and mouse devices) to the computing system 800. The computing system 800 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used.

The CPU 805 retrieves and executes programming instructions stored in the memory 820 as well as stored in the storage 830. The bus 817 is used to transmit programming instructions and application data between the CPU 805, I/O device interface 810, storage 830, network interface 815, and memory 820. Note, CPU 805 is included to be representative of a single CPU, multiple CPUs, a single CPU having multiple processing cores, and the like, and the memory 820 is generally included to be representative of a random access memory. The storage 830 may be a disk drive or flash storage device. Although shown as a single unit, the storage 830 may be a combination of fixed and/or removable storage devices, such as fixed disc drives, removable memory cards, optical storage, network attached storage (NAS), or a storage area-network (SAN).

Illustratively, the memory 820 includes a LR component 124, which includes LLFD component 302, LLFT component 304, and re-hashing component 306, all of which are described in greater detail above. Further, storage 830 includes configuration 832 and long-lived flow state table 504 discussed in greater detail above.

Advantageously, embodiments presented herein provide an improved load balancing technique (e.g., compared to conventional load balancing techniques) for adjusting the entropy values (e.g., hashed values) of encapsulated (or inner) packets that underlay (physical) devices use for load balancing decisions. Additionally, the techniques can be implemented by NVEs (e.g., hypervisor, network devices, such as a top-of-rack switch, etc.) at the overlay network, without requiring configuring physical switches in the underlay network. Further, the techniques presented herein do not require modification to the overlay headers, and thus can be compatible with a variety of different overlay protocols.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for generating entropy values for packets in an overlay network existing on top of an underlay network, comprising:
generating a first entropy value for each packet in a first group of packets received in a sequence of packets from a host;
detecting an idle amount of time between a first time when a last packet of the first group of packets in the sequence of packets is received from the host and a second time when an initial packet of a second group of packets in the sequence of packets is received from the host; and
upon determining that the idle amount of time is greater than a first threshold:
generating a second entropy value for each packet in the second group of packets,
wherein the second entropy value is different from the first entropy value;
inserting the second entropy value in an outer header of each packet in the second group of packets; and
after inserting the second entropy value in the outer header of each packet in the second group of packets, transmitting the second group of packets to the underlay network.

2. The method of claim 1,
wherein the second entropy value is generated
upon determining that the idle amount of time is greater than the first threshold and
determining that a number of packets received in the first group of packets is above a second threshold.

3. The method of claim 2,
wherein the second threshold is based on a packet reordering rate determined for the first group of packets that does not reduce throughput of the sequence of packets.

4. The method of claim 1,
wherein the first threshold is based on an amount of time determined for the first group of packets that avoids reordering of the sequence of packets.

5. The method of claim 1,
wherein generating the second entropy value comprises:
selecting a hash function from a plurality of hash functions available for generating entropy values for the sequence of packets,
wherein the selected hash function is different from a hash function used to generate the first entropy value; and
generating a hash of inner header fields of each packet in the second group of packets, based on the selected hash function.

6. The method of claim 1, further comprising determining that a number of bytes for the sequence of packets is above a size threshold.

7. The method of claim 1, further comprising in response to determining that the idle amount of time is less than or equal to the first threshold:
inserting the first entropy value in an outer header of each packet in the second group of packets; and
after inserting the first entropy value in the outer header of each packet in the second group of packets, transmitting the second group of packets to the underlay network.

8. A system, comprising:
a computer processor; and
a memory containing a program, which when executed by the processor, performs an operation for generating entropy values for packets in an overlay network existing on top of an underlay network, the operation comprising:
generating a first entropy value for each packet in a first group of packets received in a sequence of packets from a host;
detecting an idle amount of time between a first time when a last packet of the first group of packets in the sequence of packets is received from the host and a second time when an initial packet of a second group of packets in the sequence of packets is received from the host; and
upon determining that the idle amount of time is greater than a first threshold:
generating a second entropy value for each packet in the second group of packets,
wherein the second entropy value is different from the first entropy value;
inserting the second entropy value in an outer header of each packet in the second group of packets; and after inserting the second entropy value in the outer header of each packet in the second group of packets, transmitting the second group of packets to the underlay network.

9. The system of claim 8,
wherein the second entropy value is generated upon determining
that the idle amount of time is greater than the first threshold and
that a number of packets received in the first group of packets is above a second threshold.

10. The system of claim 9,
wherein the second threshold is based on a packet reordering rate determined for the first group of packets that does not reduce throughput of the sequence of packets.

11. The system of claim 8,
wherein the first threshold is based on an amount of time determined for the first group of packets that avoids reordering of the sequence of packets.

12. The system of claim 8,
wherein generating the second entropy value comprises:
selecting a hash function from a plurality of hash functions available for generating entropy values for the sequence of packets,
wherein the selected hash function is different from a hash function used to generate the first entropy value; and
generating a hash of inner header fields of each packet in the second group of packets, based on the selected hash function.

13. The system of claim 8, the operation further comprising determining that a number of bytes for the sequence of packets is above a size threshold.

14. The system of claim 8, the operation further comprising in response to determining that the idle amount of time is less than or equal to the first threshold:
inserting the first entropy value in an outer header of each packet in the second group of packets; and
after inserting the first entropy value in the outer header of each packet in the second group of packets, transmitting the second group of packets to the underlay network.

15. A computer program product, comprising:
a computer-readable storage medium having computer-readable program code embodied therewith, the computer-readable program code executable by one or more computer processors to perform an operation for generating entropy values for packets in an overlay network existing on top of an underlay network, the operation comprising:
generating a first entropy value for each packet in a first group of packets received in a sequence of packets from a host;
detecting an idle amount of time between a first time when a last packet of the first group of packets in the sequence of packets is received from the host and a second time when an initial packet of a second group of packets in the sequence of packets is received from the host; and
upon determining that the idle amount of time is greater than a first threshold:
generating a second entropy value for each packet in the second group of packets,
wherein the second entropy value is different from the first entropy value;
inserting the second entropy value in an outer header of each packet in the second group of packets; and
after inserting the second entropy value in the outer header of each packet in the second group of packets, transmitting the second group of packets to the underlay network.

16. The computer program product of claim 15,
wherein the second entropy value is generated upon determining
that the idle amount of time is greater than the first threshold and
that a number of packets received in the first group of packets is above a second threshold.

17. The computer program product of claim 16,
wherein the second threshold is based on a packet reordering rate determined for the first group of packets that does not reduce throughput of the sequence of packets.

18. The computer program product of claim 15,
wherein the first threshold is based on an amount of time determined for the first group of packets that avoids reordering of the sequence of packets.

19. The computer program product of claim 15,
wherein generating the second entropy value comprises:
selecting a hash function from a plurality of hash functions available for generating entropy values for the sequence of packets,
wherein the selected hash function is different from a hash function used to generate the first entropy value; and
generating a hash of inner header fields of each packet in the second group of packets, based on the selected hash function.

20. The computer program product of claim 15, the operation further comprising in response to determining that the idle amount of time is less than or equal to the first threshold:
inserting the first entropy value in an outer header of each packet in the second group of packets; and
after inserting the first entropy value in the outer header of each packet in the second group of packets, transmitting the second group of packets to the underlay network.

* * * * *